(12) United States Patent
Lee et al.

(10) Patent No.: US 10,197,991 B2
(45) Date of Patent: Feb. 5, 2019

(54) 3D PRINTING RESOURCE ALLOCATION

(71) Applicant: KT Corporation, Seongnam-si, Gyeonggi-do (KR)

(72) Inventors: Zucheul Lee, Yongin-si (KR); Daehwan Kim, Yongin-si (KR); Yeong-il Seo, Seoul (KR)

(73) Assignee: KT Corporation, Seongnam-si, Gyeonggi-do (KR)

( * ) Notice: Subject to any disclaimer, the term of this patent is extended or adjusted under 35 U.S.C. 154(b) by 366 days.

(21) Appl. No.: 14/950,363

(22) Filed: Nov. 24, 2015

(65) Prior Publication Data

US 2016/0159012 A1  Jun. 9, 2016

(30) Foreign Application Priority Data

Dec. 5, 2014  (KR) .......................... 10-2014-0174243

(51) Int. Cl.
| | |
|---|---|
| *G05B 19/41* | (2006.01) |
| *G05B 19/418* | (2006.01) |
| *G05B 19/4093* | (2006.01) |
| *B33Y 50/02* | (2015.01) |

(52) U.S. Cl.
CPC .  *G05B 19/41865* (2013.01); *G05B 19/40937* (2013.01); *B33Y 50/02* (2014.12); *G05B 2219/35212* (2013.01); *G05B 2219/35215* (2013.01); *G05B 2219/49023* (2013.01); *Y02P 90/265* (2015.11)

(58) Field of Classification Search
CPC .............. B33Y 50/02; G05B 19/41865; G05B 19/40937; G05B 2219/32328; G05B 2219/35134; G05B 2219/35212; G05B 2219/35215; G05B 2219/49007; G05B 2219/49023; B29C 67/0088; Y02P 90/265
See application file for complete search history.

(56) References Cited

U.S. PATENT DOCUMENTS

| | | | | |
|---|---|---|---|---|
| 2014/0368865 | A1* | 12/2014 | Gutnik | G06F 3/1222 358/1.15 |
| 2015/0154321 | A1* | 6/2015 | Schmidt | B29C 67/0092 700/98 |
| 2015/0269289 | A1* | 9/2015 | Kim | G06F 17/5009 703/6 |
| 2017/0176979 | A1* | 6/2017 | Lalish | G05B 19/4099 |

FOREIGN PATENT DOCUMENTS

KR  10-2014-0102240 A  8/2014

* cited by examiner

*Primary Examiner* — Jason Lin
(74) *Attorney, Agent, or Firm* — Brundidge & Stanger, P.C.

(57) ABSTRACT

In accordance with at least one embodiment, 3D printing resource allocation may include receiving 3D modeling data from a device; slicing the 3D modeling data along a plurality of slicing directions; analyzing the sliced 3D modeling data, with the analyzing pertaining to, at least, a calculated cost and estimated quality of for the slicing of the 3D modeling data along each of the respective slicing directions; generating at least one recommendation for 3D printing based on, at least, the analysis of the sliced 3D modeling data; and transmitting the at least one 3D printing recommendation.

15 Claims, 7 Drawing Sheets

⟨PRINTER ID : 0017⟩                                                500

| SLICING DIRECTION | ESTIMATED WORKING TIME | ESTIMATED QUALITY | COST |
|---|---|---|---|
| A FIRST SLICING DIRECTION | 12 HOURS | MID | $ 1000 |
| A SECOND SLICING DIRECTION | 18 HOURS | HIGH | $ 1200 |
| A THIRD SLICING DIRECTION | 10 HOURS | LOW | $ 600 |

FIG. 7

3D PRINTING RESOURCE ALLOCATION

BACKGROUND 3D printing is a technology for creating a three-dimensional objects based on three-dimensionally designed data by synthesizing various materials together. The 3D printing, called a third industrial revolution, is expected to change technological paradigms in numerous fields including manufacturing.

Methods of making three-dimensional objects are divided into an additive manufacturing method that manufactures a three-dimensional object by stacking a solid specific material, and a subtractive manufacturing method that cuts or sharpens a three-dimensional object through machine processing. The subtractive manufacturing method is performed by a 4- or 5-axis processor, and has been already commercialized and widely used in industrial fields.

Additive manufacturing methods include a fused deposition modeling (FDM) method by which a plastic material is melted and is sprayed out by a nozzle. This method is a relatively cheap 3D printing solution, and is believed to reduce consumption of materials relative to other 3D printing methods. Additive manufacturing methods also include a selective laser sintering (SLS) method by which a product is made by thinly spreading a powder material on a field and sintering only a selected part using a laser. 3-dimensional printing (3DP) includes thinly spreading a powder-like material, like the SLS method, but spraying an adhesive and allowing it to harden, instead of applying a laser to it.

3D printing is prefaced by processes that include: 3D modeling; standard tessellation language (STL) or additive manufacturing format (AMF) file conversion; G-code conversion; and real object printing using a host program.

3D modeling pertains to forming an object in a three-dimensional configuration using computer aided design (CAD) software, animation modeling software such as Maya and MAX, a 3D scanner, etc. The resulting 3D modeling data may be converted to an STL file that can be received and processed by a 3D printer. The conversion into the STL file is performed by common CAD software.

In this regard, Korean Patent Application Publication No. 2014-0102240 describes 3D printing connected to a network.

SUMMARY

In one example embodiment, a 3D printing resource allocation method includes receiving 3D modeling data from a device; slicing the 3D modeling data along a plurality of slicing directions; analyzing the sliced 3D modeling data, with the analyzing pertaining to, at least, a calculated cost and estimated quality of for the slicing of the 3D modeling data along each of the respective slicing directions; generating at least one recommendation for 3D printing based on, at least, the analysis of the sliced 3D modeling data; and transmitting the at least one 3D printing recommendation.

In another example embodiment, a server includes, at least, a receiver to receive 3D modeling data; a simulator configured to slice the 3D modeling data along a plurality of slicing directions; an analyzer configured to analyze the sliced 3D modeling data, with the analyzing pertaining to, at least, a calculated cost and estimated quality for slicing along each of the respective slicing directions; a manager to generate 3D printing recommendation for 3D printing based on, at least, the analysis of the sliced 3D modeling data; and a transmitter configured to transmit, to the device, the at least one 3D printing recommendation.

In at least one more example embodiment, a computing device includes a memory and a processing unit. The processing unit is to receive 3D modeling data, slice the 3D modeling data in a plurality of slicing directions, analyze the sliced 3D modeling data, with the analysis pertaining to at least a calculated cost and estimated quality for slicing the 3D modeling data, generate recommendations for 3D printing based on, at least, the analysis, and transmit the 3D printing recommendation lists to the device.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In accordance with the example embodiments, it is possible to provide a method for outputting 3D modeling data by a 3D printer selected by a user device through virtual simulation in a multiple number of slicing directions.

It is possible to provide a method for producing 3D printing cost estimation and a predicted quality list for the 3D modeling data according to the slicing directions based on output results obtained from the virtual simulation, and a method for transmitting the produced 3D printing cost estimation and predicted quality list to the user device.

It is possible to increase user's options for the 3D printing regarding an output price and output quality by changing a slicing direction even within an identical printer. A user can be provided with, in real time, an output price and output quality according to a slicing direction based on a cloud environment.

Figure 1:
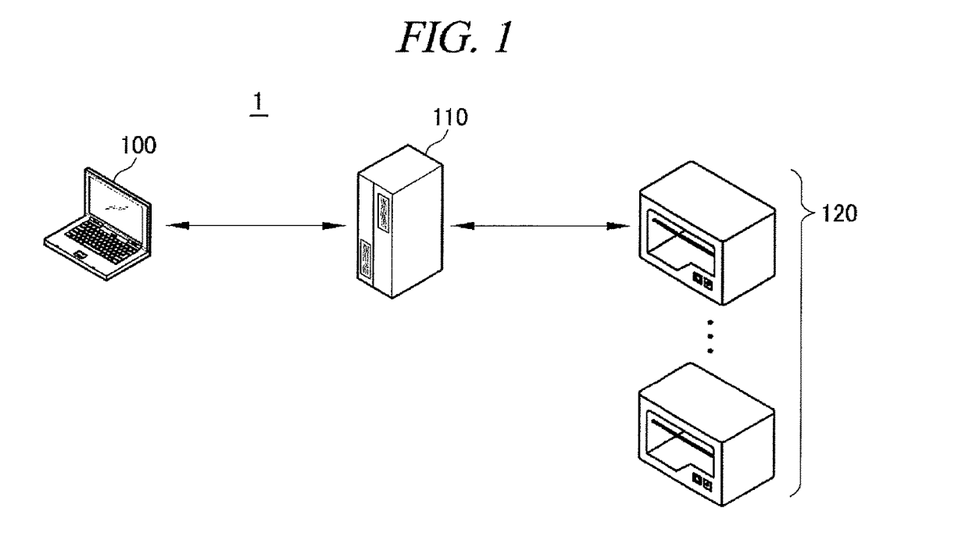
FIG. 1 is a depiction of a system to implement 3D printing resource allocation, in accordance with example embodiments described herein.

FIG. 1 is a depiction of a system to implement 3D printing resource allocation, in accordance with example embodiments described herein. Referring to FIG. 1, a 3D printing recommendation system 1 may include a user terminal 100, a 3D printing management server 110 and 3D printers 120.

As referenced herein, slicing of 3D modeling data may refer to translating 3D modeling data into individual layers, in the aforementioned 3D shape, to be used as machine code for subsequent printing.

Further, as referenced herein, a virtual simulation may be performed by virtual simulation software adopting a multiple number of simulators for a 3D printing recommendation in a cloud environment. The simulators may virtually slice across 3D modeling data in various slicing directions using a 3D printer selected by user terminal 100 to produce multiple cross-sections of the 3D modeling data. Thus, virtual simulation software may provide a multiple number of slicing outputs pertaining to respective slicing directions.

Further still, as referenced herein, G-code may refer to a numerical language, utilized by a program, application, or code to slice 3D modeling data, that may be used to provide instructions to a 3D printer. The printing instructions may include height, width, and thickness parameters for each of the individual layers.

User terminal 100 may produce 3D modeling data using various types of software that may be hosted, executed, and/or instantiated on user terminal 100 or on a corresponding cloud resource. In another example embodiment of 3D printing recommendation system may store, host, and/or execute software to, upon execution, produce the 3D modeling data. User terminal 100 may transmit the produced 3D modeling data to a 3D printing management server 110. The 3D modeling data may be produced in accordance with, e.g., standard tessellation language (STL), additive manufacturing format (AMF), etc.

User terminal 100 may select one of a multiple number of 3D printers connected to a cloud environment for slicing the 3D modeling data. In addition, user terminal 100 may select one of a 3D printing cost estimate and a predicted quality list, which have been transmitted from the 3D printing management server 110.

An interface associated with user terminal 100 may facilitate a selection of one or more of 3D printers and/or one or both of the 3D printing cost estimate and predicted quality list, and further facilitate transmission of the 3D modeling data and selection signal of a slicing direction from among a plurality of slicing directions included in the 3D printing cost estimate and a predicted quality list to 3D printing management server 110.

3D printing management server 110 may receive, from user terminal 100, the 3D modeling data as well as a signal identifying the selected one of the multiple 3D printers connected to the cloud environment.

3D printing management server 110 may provide slicing outputs which have different slicing directions respectively by the selected 3D printer selected by the user terminal 100 after executing one or more virtual simulations that include virtually slicing the 3D modeling in multiple slicing directions. For example, the 3D printing management server 110 may include multiple simulators, and subject the 3D modeling data received from user terminal 100 to slicing simulations by the multiple simulators in at least one slicing direction, as if executed by the 3D printer selected by the user terminal 100. For example, the 3D printing management server 110 may virtually simulate a 3-dimensional polygon mesh model based on the 3D modeling data in a multiple number of slicing directions, as if executed by the selected 3D printer.

The 3D printing management server 110 may perform multiple virtual simulations, in parallel, in accordance with the multiple slicing directions, and compare and/or analyze the results in a time-efficient manner. Accordingly, this method can significantly reduce the simulation time, compared to a conventional offline method that determines one slicing direction and performs the simulations sequentially.

The 3D printing management server 110 may produce 3D printing cost estimate and a predicted quality list for the 3D modeling data according to each of the slicing directions based on a comparison and/or analysis of the output results obtained from the virtual simulation. For example, the analysis resulting in a 3D printing cost estimate may include predicting an output time, i.e., time for completion of 3D printing, and predicting quality of the output according to a comparison of multiple simulations, all of which may lead to a recommendation for at least a compatible type of 3D printer, which may then be selected by the user terminal 100 for at least a portion of the 3D printing job. Different weights may be applied to the predicted output time, the predicted quality, and the type of the 3D printer previously selected by the user terminal 100 upon the 3D printing cost estimate. The predicated quality of the 3D printing may be based on change of a slicing cross section according to each of the slicing directions.

The 3D printing cost estimate and predicted quality list may include a time estimate for completion of the 3D printing, a predicted quality of the 3D printing, and an estimated output price for completion of a portion of the 3D printing in each of the slicing directions.

3D printing management server 100 may transmit the produced 3D printing cost estimate and predicted quality list to user terminal 100. User terminal 100 may output the 3D printing cost estimate and predicted quality list that have been transmitted from the 3D printing management server 110. Detailed descriptions in this regard will be provided later, referring to FIG. 5.

3D printing management server 110 may receive, from the user device 100, data regarding a selected slicing direction from the transmitted 3D printing cost estimate and predicted quality list. For example, data regarding the selected slicing direction from the transmitted 3D printing cost estimate and predicted quality list may pertain to a slicing direction from among a plurality of slicing directions. Also, the 3D printing management server 110 may transmit an output command to slice the 3D modeling data in the slicing direction corresponding to one selected from the 3D printing cost estimate and the predicted quality list to the 3D printer 120 selected by the user terminal 100.

3D printer 120 may receive a command to execute at least a portion of the 3D printing assignment or task along the slicing direction selected by the user terminal 100 from the 3D printing management server 110. The 3D printer 120 may output the 3D modeling data in the slicing direction included in the received command.

Figure 2:
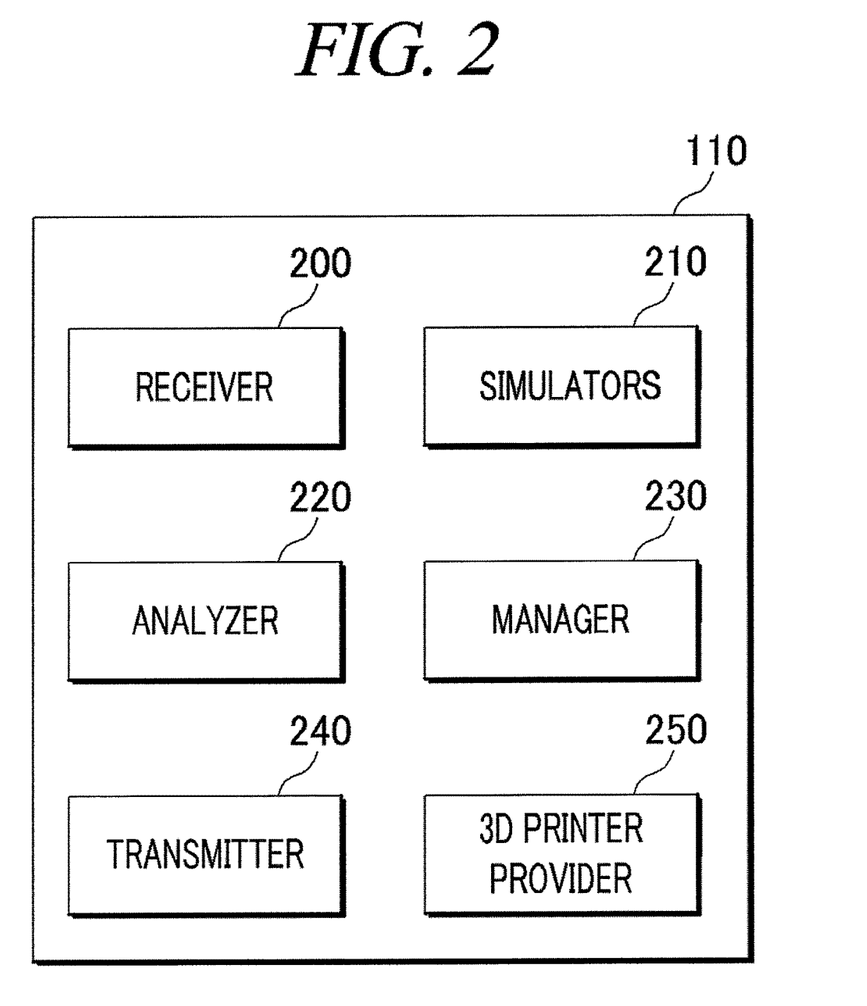
FIG. 2 shows a block diagram of a server to implement at least portions of 3D printing resource allocation, in accordance with example embodiments described herein.

FIG. 2 shows a block diagram of a server to implement at least portions of 3D printing resource allocation, in accordance with example embodiments described herein. Referring to FIG. 2, the 3D printing management server 110 may include a receiver 200, a simulator 210, an analyzer 220, a manager 230, a list transmitter 240, and a 3D printer provider 250.

Receiver 200 may to configured, programmed, and/or designed to receive 3D modeling data from user terminal 100. 3D printing management server 110 may access to one or more of a plurality of available 3D printers, at least one of which may be selected by user terminal 100 after the 3D modeling data receiver 200 receives the 3D modeling data. Further, 3D printing management server 110 may transmit product specifications of the one or more available 3D printers to user terminal 100. 3D printing management server 110 may provide recommendations for one or more of the available 3D printers for the 3D printing assignments or tasks before user terminal 100 transmits the 3D modeling data.

Receiver 210 may be further configured, programmed, and/or designed to receive, from user terminal 100, a signal that identifies at least one of multiple 3D printers that are connected to user terminal 100 and 3D printing management server 110 in a cloud environment. Receiver 210 may be further configured, programmed, and/or designed to receive, from user terminal 100, a signal to identify a selected one of the 3D printers concurrently or otherwise corresponding to receiving the 3D modeling data.

Simulators 210 may be configured, programmed, and/or designed to implement virtual simulation by slicing the 3D modeling data in a multiple number of slicing directions, in a manner virtually similar to that of the 3D printer selected by user terminal 100. Unless context requires otherwise, the continuing description will reference simulator 210, singularly, or simulators 210, collectively. The references thereto are not intended to be limiting.

3D printing management server 110 may include a multiple number of simulators. Each of the virtual simulators may emulate a virtual simulation that includes slicing 3D modeling data, in at least one slicing direction, in accordance with the performance specifications of at least one of the multiple 3D printers that are connected to user terminal 100 and 3D printing management server 110 in a cloud environment.

For example, a managing one of simulators 210 may be configured, programmed, and/or designed to analyze the 3D modeling data to determine in which direction the 3D printer selected by the user terminal may slice the 3D modeling data. The managing simulator 210 may additionally or alternatively assign one of simulators 210 to each of the slicing directions, and slice and output the 3D modeling data through the corresponding simulator in the direction set for the corresponding simulator.

An example description in this regard is provided below with reference to FIG. 3.

Figure 3:
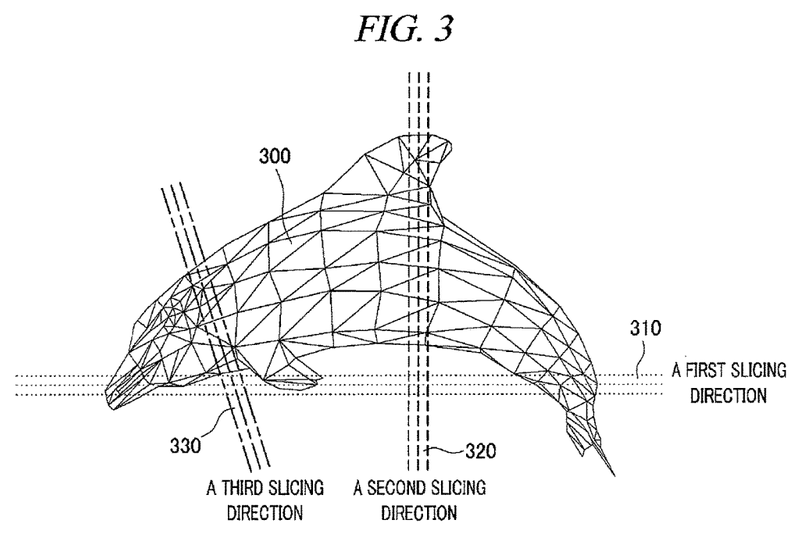
FIG. 3 shows an example of 3D modeling data adaptively sliced, in accordance with embodiments of 3D printing resource allocation described herein.

FIG. 3 shows an example of 3D modeling data adaptively sliced, in accordance with embodiments of 3D printing resource allocation described herein. The dolphin-shape 3D modeling data 300 may be, for example, a three-dimensional polygon mesh model. One or more of simulators 210 may analyze the dolphin-shape 3D modeling data 300, including determining whether the 3D printer selected by user terminal 100 can slice and output the dolphin-shape 3D modeling data 300, for example, in three (3) directions.

For example, the simulator 210 may enable a first embodiment of simulator 210 to output the data in a first direction 310, a second embodiment of simulator 210 to output the data in a second direction 320, and a third embodiment of simulator 210 to output the data in a third direction 330 by executing virtual simulations.

Returning to FIG. 2, analyzer 220 may be configured, programmed, and/or designed to estimate the cost of performing the 3D printing for one or more of the first, second, and third embodiments of simulator 210, referenced above; and analyzer 220 may estimate an expected quality of the 3D modeling data as sliced, in each of the slicing directions by each of the first, second, and third embodiments of simulator 210 in accordance with the slicing in the virtual simulation.

For example, analyzer 220 may monitor each sliced cross section while the simulation is being performed. Analyzer 220 may predict a quality of the 3D modeling data to be output based on a change amount between adjacent sliced cross sections. For example, it is assumed that a 3D modeling data is sliced in a first direction and a second direction and analyzer 220 may predict each quality of the 3D modeling data to be output pertaining to each direction. If a change amount between adjacent cross sections sliced in the first direction is greater than a change amount between adjacent cross sections sliced in the second direction, analyzer 220 may determine the quality of the 3D modeling data pertaining to the first direction is lower than the quality of the 3D modeling data pertaining to the second direction. That is, the quality of the 3D modeling data pertaining to the second direction is higher than the quality of the 3D modeling data pertaining to the first direction. The predicted quality such as high and low may be included in the 3D printing cost estimate and the predicted quality list.

Analyzer 220 may estimate each of the cost of performing the 3D printing based on the estimated amount of time, the predicted quality and the selected 3D printer. Different weights may be applied to the estimated amount of time, the level of a predicted quality and the selected 3D printer.

For example, analyzer 220 may estimate each of the cost of performing the 3D printing by multiplying the estimated amount of time by a pre-defined hourly charge of the selected 3D printer. Further, analyzer 220 may readjust the cost of performing the 3D printing based on the predicted quality. For example, analyzer 220 may convert the average value of the change of each sliced cross section to percentage and readjust the cost of performing the 3D printing by multiplying the cost of performing the 3D printing by the percentage.

Manager 230 may generate a recommendation for a 3D printer. The 3D printing recommendation may include 3D printing cost estimate and the predicted quality list including an estimated amount of time for completing the 3D printing assignments or tasks for the first, second, and third embodiments of simulator 210 both individually and collectively; a predicted quality therefore, and an estimated output price for each of the slicing directions.

Figure 4:
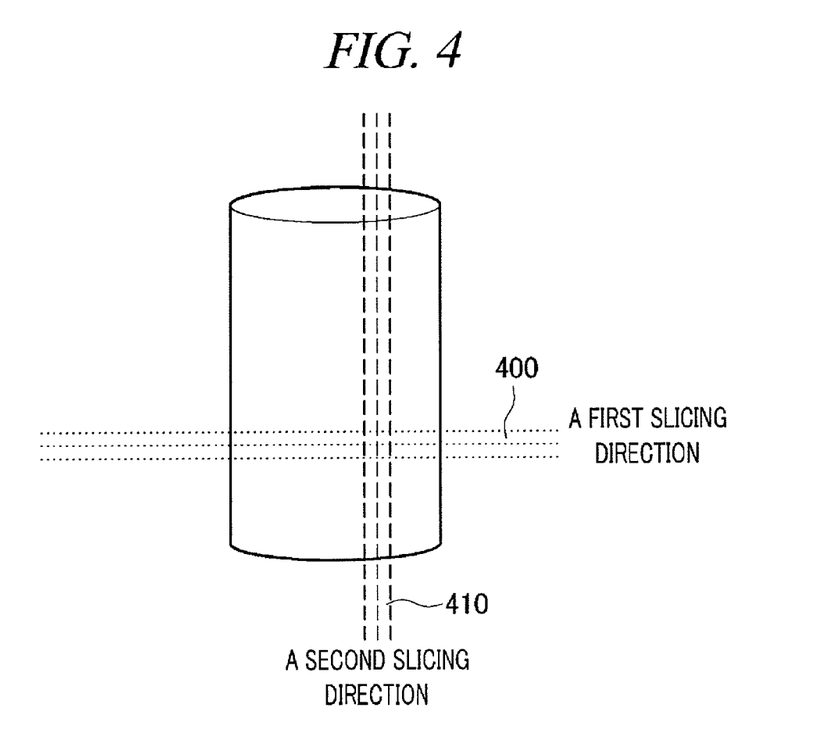
FIG. 4 shows another example of 3D modeling data adaptively sliced, in accordance with embodiments of 3D printing resource allocation described herein.

FIG. 4 shows another example of 3D modeling data adaptively sliced, in accordance with embodiments of 3D printing resource allocation described herein. The cylindrical 3D modeling data illustrated in FIG. 4 may be sliced and output, for example, in a first direction 400 and a second direction 410.

FIG. 4 shows another example of 3D modeling data adaptively sliced, in accordance with embodiments of 3D printing resource allocation described herein.

In case of the first direction 400, since there is almost no change between the current sliced cross section and the next sliced cross section, it may be determined that the output quality will be good.

As set forth above, analyzer 220 may predict the quality of the 3D modeling data based on the a change amount between adjacent slicing cross sections.

In case of the second direction 410, since there is a significant change between the current slicing cross section and the next slicing cross section, it may be determined that the output quality will not be good as compared to the case of the first direction 400.

Returning to FIG. 2, transmitter 240 may be configured, programmed, and/or designed to transmit, to the user terminal 100, the 3D printing cost estimate and predicted quality list produced by manager 230.

3D printer provider 250 may be configured, programmed, and/or designed to provide user device 100 data regarding available 3D printers connected to user device 100 and 3D printer recommendation server 100 in a cloud computing environment.

Transmitter 240 may be further configured, programmed, and/or designed to transmit an output command, to one or more of the available 3D printers, to execute at least a portion of a 3D printing assignment or task for a particular slicing direction based on the aforementioned analysis.

The output command may further include a G-code. Since relevant technologies like transmitting a G-code to a host or the 3D printer 120 are known in the technical field of the present disclosure, detailed descriptions in this regard are omitted herein.

Figure 5:
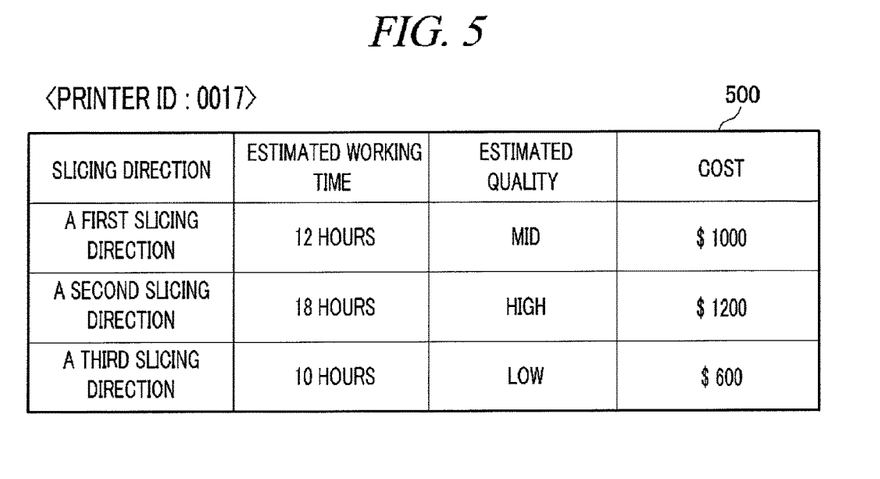
FIG. 5 shows an example of results of an analysis of 3D modeling data to be utilized in allocating 3D printing resources, in accordance with embodiments described herein.

FIG. 5 shows an example of results of an analysis of 3D modeling data to be utilized in allocating 3D printing resources, in accordance with embodiments described herein. Referring to FIG. 5, the 3D printing cost estimate and the predicted quality list 500 may include 3D printer ID, an estimated working time for completing at least a portion of the 3D printing assignment or task for each of the slicing directions, an estimated quality, and output price and so on.

For example, 3D printing management server 110 may transmit the 3D printing cost estimate and the predicted quality list 500 to user terminal 100, and the user terminal 100 may output the 3D printing cost estimate and the predicted quality list 500.

For example, the 3D printing cost estimate and the predicted quality list 500 output by the user terminal 100 may display output time, and predicted quality and output price according to the first, second and third directions. For the first direction, the estimated output time may be 12 hours, the predicted quality may be fair, and the output price may be $1000. For the second direction, the estimated output time may be 18 hours, the predicted quality may be high, and the output price may be $1200. For the third direction, the estimated output time may be 10 hours, the predicted quality may be low, and the output price may be $600.

User terminal 100 may provide interface to enable a user to select one of the output 3D printing cost estimation and predicted quality list.

Figure 6:
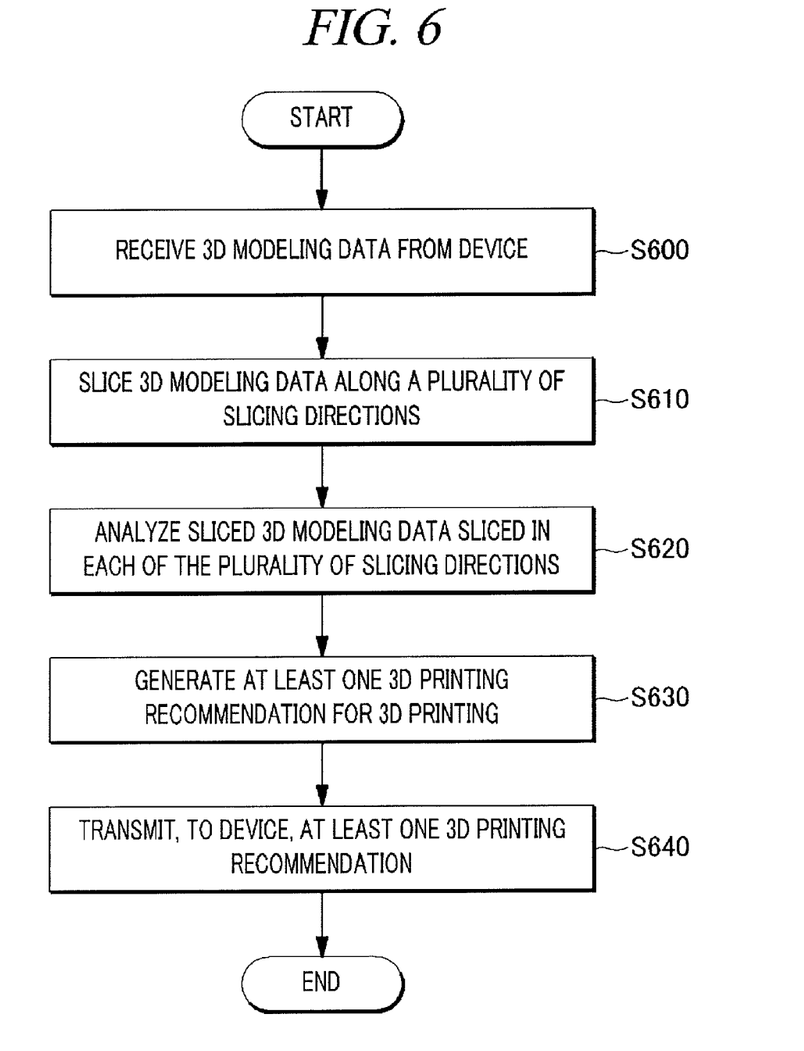
FIG. 6 shows a flow diagram for allocating 3D printing resources, in accordance with embodiments described herein.

FIG. 6 shows a flow diagram for allocating 3D printing resources, in accordance with embodiments described herein. According to the description of the operations in FIG. 6, any of the operations depicted and described herein may be implemented as computer-readable instructions stored on a computer-readable medium. The computer-readable instructions may, for example, be executed by a processor of any one user device 100 and/or 3D printer recommendation server 110, as referenced herein, having a network element and/or any other device corresponding thereto, particularly as applicable to the applications and/or programs described above corresponding to the configuration 1 for 3D printing resource allocation. The example process may include one or more operations, actions, or functions as illustrated by one or more blocks S600, S610, S620, S630, S640, S650, and S6600. Although illustrated as discrete blocks, various blocks may be divided into additional blocks, combined into fewer blocks, or eliminated, depending on the desired implementation. Processing may begin at S600.

The 3D printing recommendation method in a cloud environment according to a slicing direction in accordance with an example embodiment as illustrated in FIG. 6 includes the steps sequentially carried out in the system of FIG. 1. Accordingly, the descriptions of the steps, even though they are omitted herein, are also applied to the 3D printing recommendation method in a cloud environment according to a slicing direction in accordance with an example embodiment as illustrated in FIG. 6.

At S600, 3D printing management server 110 may receive the 3D modeling data from user terminal 100.

At S610, 3D printing management server 110 may slice the 3D modeling data by using the 3D printer selected by the user terminal 100 through virtual simulation in a multiple number of slicing directions.

At S620, 3D printing management server 110 may analyze a 3D printing cost estimate and a predicted quality list for the 3D modeling data according to each slicing direction based on the output results obtained from the virtual simulation.

At S640, 3D printing management server 110 may generate at least one 3D printing recommendation for 3D printing based on, at least, the analysis of the sliced 3D modeling data.

At S650, 3D printing management server 110 may transmit to the device 100, the at least one 3D printing recommendation.

Figure 7:
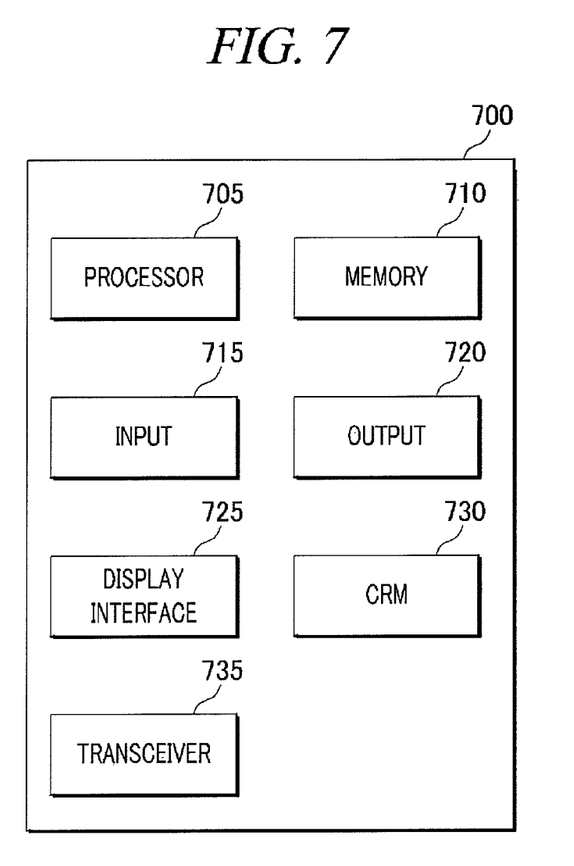
FIG. 7 shows an example computing device on which and by which at least portions of 3D printing resource allocation may be implemented, arranged in accordance with one or more embodiments described herein.

FIG. 7 shows an example computing device on which and by which at least portions of 3D printing resource allocation may be implemented, arranged in accordance with one or more embodiments described herein.

FIG. 7 shows an illustrative computing embodiment, in which any of the processes and sub-processes relating to allocating 3D printing resources may be implemented as computer-readable instructions stored on a computer-readable medium. The computer-readable instructions may, for example, be executed by a processor of 3D printing management server 110, as referenced herein, having a network element and/or any other device corresponding thereto, particularly as applicable to the applications and/or programs described above corresponding to allocating 3D printing resources.

In a very basic configuration, a computing device 700 may typically include, at least, one or more processors 705 and a system memory 710. Computing device 700 may also include one or more input components 715, one or more output components 720, a display component 725, a computer-readable medium 730, and a transceiver 735.

Processor(s) 705 may refer to, e.g., a microprocessor, a microcontroller, a digital signal processor, or any combination thereof.

Memory 710 may refer to, e.g., a volatile memory, non-volatile memory, or any combination thereof. Memory 710 may store, therein, an operating system, an application, and/or program data. That is, memory 710 may store executable instructions to implement any of the functions or operations described above and, therefore, memory 710 may be regarded as a computer-readable medium.

Input component 715 may refer to a built-in or communicatively coupled keyboard, touch screen, or telecommunication device. Further, an input component, if not built-in to computing device 700, may be communicatively coupled thereto via short-range communication protocols including, but not limited to, radio frequency or Bluetooth.

Output component 720 may refer to a component or module, which may be built-in or removable from computing device 700, which is configured to output data to an external device.

Display component 725 may refer to, e.g., a solid state display that may have touch input capabilities. That is, a display component may include capabilities that may be shared with or replace those of the aforementioned input components.

Computer-readable medium 730 may refer to a separable machine readable medium that is configured to store one or more programs that embody any of the functions or operations described above. That is, a computer-readable medium, which may be received into or otherwise connected to a drive component of computing device 700, may store executable instructions to implement any of the functions or operations described above. These instructions may be complimentary or otherwise independent of those stored by memory 710.

Transceiver 735 may refer to a network communication link for computing device 700, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A 3D printing resource allocation method, comprising:
receiving 3D modeling data received from a device;
virtually slicing the 3D modeling data along a plurality of slicing directions; analyzing the sliced 3D modeling data sliced in each of the plurality of slicing directions, the analyzing pertaining to, at least, a calculated cost and estimated quality for the slicing along each of the respective slicing directions;
generating at least one 3D printing recommendation for 3D printing based on, at least, the analysis of the sliced 3D modeling data, the at least one 3D printing recommendation including at least one of an estimated working time for completing at least a portion of the 3D modeling data, the calculated cost, or the estimated quality for each of the respective slicing direction;
wherein the calculated cost is based on at least one of an estimated amount of time for completion of the printing, an estimated quality of the printing, or a type of the respective ones of 3D printers;
transmitting, to the device, the at least one 3D printing recommendation;
receiving, from the device, data regarding a selected one of the plurality of slicing directions; and
transmitting, to a selected 3D printer, an output command to slice the 3D modeling data in the selected slicing direction; wherein the selected 3D printer is to be operated based on the output command.

2. The method of claim 1, further comprising:
receiving, from the device, data regarding the selected 3D printer.

3. The method of claim 2, wherein the slicing is performed based on information of the selected 3D printer.

4. The method of claim 1, wherein the 3D modeling data is formed by a stereo lithographic process or in accordance with an Additive Manufacturing Format.

5. The method of claim 1, wherein the slicing is performed in accordance with a 3D polygon mesh model that is formed based on the 3D modeling data.

6. The method of claim 1, wherein the quality based on a change of cross-sections associated with each of the plurality of slicing directions.

7. The method of claim 1, further comprising:
transmitting, to the 3D printer, the data regarding the selected slicing direction and the 3D modeling data.

8. A server, comprising:
a receiver configured to receive, from a device, 3D modeling data;
a simulator configured to virtually slice the 3D modeling data along a plurality of slicing directions;
an analyzer configured to analyze the sliced 3D modeling data sliced in each of the plurality of slicing directions, the analyzing pertaining to, at least, a calculated cost and estimated quality for slicing along each of the respective slicing direction;
wherein the analyzer calculates the calculated cost based on at least one of an estimated amount of time for completion of the printing, an estimated quality of the printing, and a type of the respective ones of the 3D printers;
a manager configured to generate 3D printing recommendation for 3D printing based on, at least, the analysis of the sliced 3D modeling data, as produced by the analyzer, the at least one 3D printing recommendation including at least one of an estimated working time for completing at least a portion of the 3D modeling data, the calculated cost, or the estimated quality for each of the respective slicing directions; and
a transmitter configured to transmit, to the device, the at least one 3D printing recommendation,
wherein the receiver is further configured to receive, from the device, data regarding a selected one of the plurality of slicing directions, and
the transmitter is further configured to transmit, to a selected 3D printer, an output command to slice the 3D modeling data in the selected slicing direction; wherein the selected 3D printer is to be operated based on the output command.

9. The server of claim 8, further comprising:
a 3D printer interface configured to provide, to the device, data regarding available 3D printers in a cloud environment from which the 3D printer is selected,
wherein the receiver is further configured to receive, an identifier of the selected 3D printer.

10. The server of claim 9, wherein the simulator performs the slicing based on the received information regarding the selected 3D printer.

11. The server of claim 8, wherein the 3D modeling data is formed by a stereo lithographic process or in accordance with an Additive Manufacturing Format.

12. The server of claim 8, wherein the simulator performs the slicing using a 3D polygon mesh model that is formed based on the 3D modeling data.

13. The server of claim 8, wherein the analyzer estimates the quality based on a change of cross-sections associated with each of the slicing directions.

14. The server of claim 8, wherein the transmitter is further configured to transmit, to the 3D printer, the data regarding the selected slicing direction and the 3D modeling data.

15. A computing device, comprising:
   a memory; and
   a processing unit configured to:
   receive 3D modeling data from a device,
   virtually slice the 3D modeling data along a plurality of slicing directions, analyze the sliced 3D modeling data sliced in each of the plurality of slicing directions, the analyzing pertaining to, at least, a calculated cost and estimated quality for the slicing of the 3D modeling data along each of the respective slicing directions;
   generate at least one 3D printing recommendation for 3D printing based on, at least, the analysis of the sliced 3D modeling data, the at least one 3D printing recommendation including at least one of an estimated working time for completing at least a portion of the 3D modeling data, the calculated cost, or the estimated quality for each of the respective slicing direction;
   wherein the calculated cost is based on at least one of an estimated amount of time for completion of the printing, an estimated quality of the printing, or a type of the respective ones of 3D printers;
   transmit, to the device, the at least one 3D printing recommendation, receive, from the device, data regarding a selected one of the plurality of slicing directions, and
   transmit, to a selected 3D printer, an output command to slice the 3D modeling data in the selected slicing direction; wherein the selected 3D printer is to be operated based on the output command.

* * * * *